A. N. PIERMAN.
PHOTOGRAPHIC CAMERA.
APPLICATION FILED NOV. 6, 1908.
1,124,313.
Patented Jan. 12, 1915.
2 SHEETS—SHEET 1.
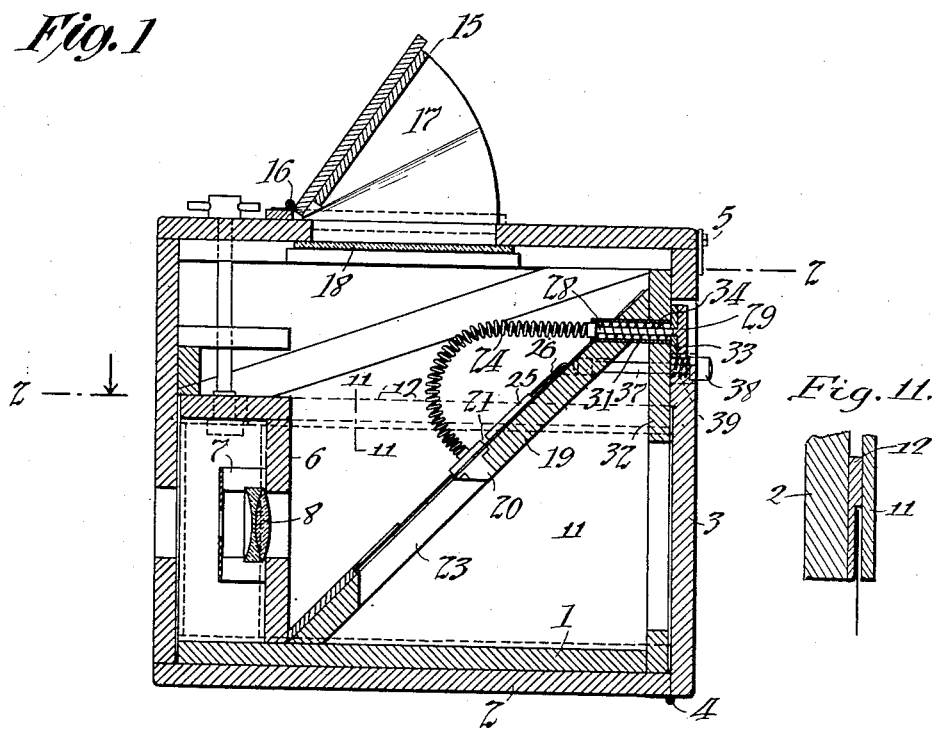
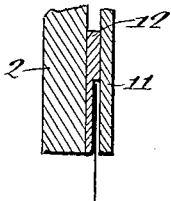
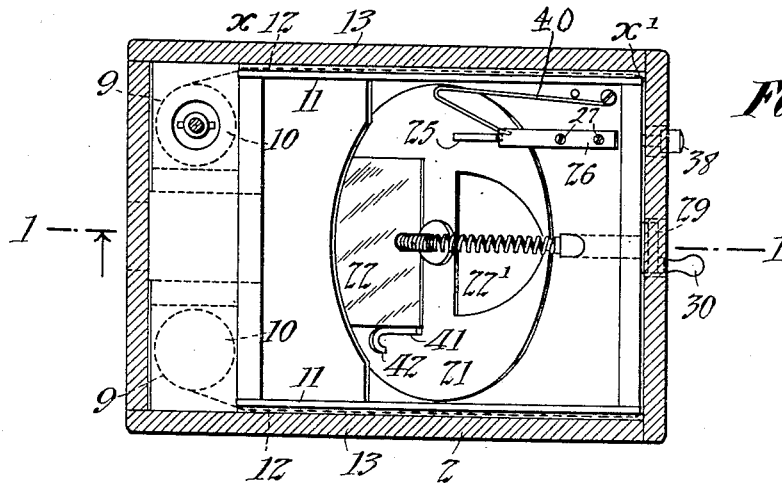
Witnesses:
Frank D Lewis
Dyer Smith
Inventor:
Alexander N. Pierman
by Frank L. Dyer
Atty.

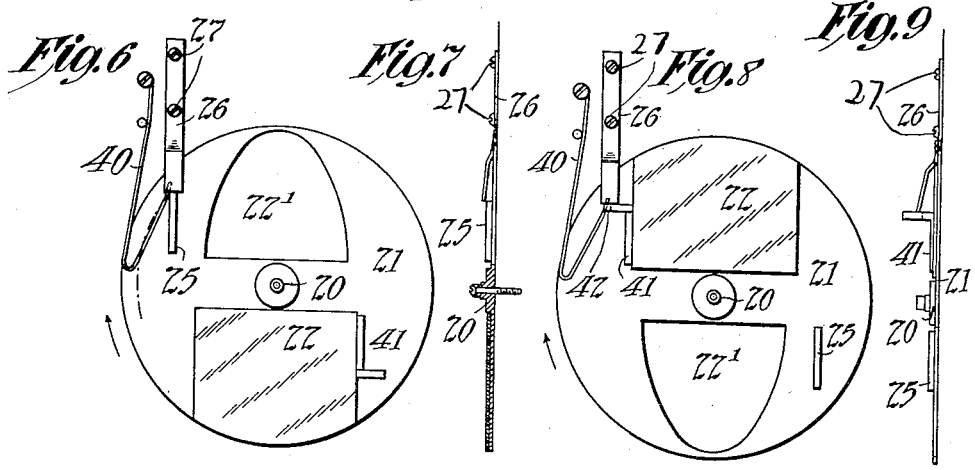

UNITED STATES PATENT OFFICE.

ALEXANDER N. PIERMAN, OF NEWARK, NEW JERSEY, ASSIGNOR, BY DIRECT AND MESNE ASSIGNMENTS, OF ONE-FOURTH TO FRANK L. DYER, OF MONTCLAIR, NEW JERSEY, AND ONE-FOURTH TO LEONARD H. DYER, OF GREENWICH, CONNECTICUT.

PHOTOGRAPHIC CAMERA.

1,124,313.   Specification of Letters Patent.   Patented Jan. 12, 1915.

Application filed November 6, 1908. Serial No. 461,266.

*To all whom it may concern:*

Be it known that I, ALEXANDER N. PIERMAN, a citizen of the United States, and a resident of Newark, in the county of Essex and State of New Jersey, have invented certain new and useful Improvements in Photographic Cameras, of which the following is a description.

My invention relates to that class of cameras in which the image to be photographed is thrown by the objective upon a surface that reflects to the eye of the operator, or upon a visible focusing surface. A common form of such cameras and that which I have adopted, is that in which a mirror, arranged at an angle, receives the image and reflects it upwardly to a horizontally disposed focusing ground glass.

The objects of my invention are to produce an efficient and inexpensive form of camera, capable of taking pictures with either an instantaneous or a time exposure. Pursuant to these objects, the shutter is formed to carry the reflecting mirror which normally covers the exposure opening and reflects the image, thrown upon it by the objective, upon the focusing glass. This image obtained, my invention contemplates the provision of simple manipulative devices for rotating the shutter from in front of the exposure opening, to cause either an instantaneous or a time exposure. Preferably, and as here shown, this operation is performed by a single, simple manipulative means.

The invention has been shown applied to a style of camera in which is exposed a continuous length of sensitized film, and in which the film rolls are carried in front of the focal plane. Obviously, however, it may be embodied in other forms; that is to say, the structural elements may be varied within the scope of the appended claims without departing from the spirit of the invention.

Reference is hereby made to the accompanying drawings forming part of this specification, in which—

Figure 1 represents a central, vertical longitudinal section through the camera, taken on line 1—1 of Fig. 2; Fig. 2 is a horizontal section taken on line 2—2 of Fig. 1; Fig. 3 is a rear view of the camera showing the hinged door in place; Figs. 4 and 5 are detail views of the means for tensioning the shutter spring; Figs. 6 and 8 are details showing the shutter held respectively in non-exposing and in exposing positions; Figs. 7 and 9 are side elevations of the same, respectively, Fig. 7 being shown partly in section, Fig. 10 is a detail in perspective, showing a lug or stop on the shutter, and Fig. 11 is an enlarged section on line 11—11 of Fig. 1.

The camera comprises an inner part or section 1, fitting and sliding endwise into an outer box or casing 2, having a door 3, hinged at the bottom at 4, and retained by latches 5 at the top. When these latches are withdrawn, the door is adapted to swing downwardly to permit the withdrawal of the inner section 1. Near the front the inner section 1 has a vertical partition 6, upon which is mounted the frame 7, which carries the objective 8. On each side of the objective are recesses 9, 9, adapted to receive films or cartridges, shown in dotted lines of Fig. 2 at 10, 10. The film passes from the supply roll along the sides of the inner section, between the side frame members 11 and thin light-excluding members 12, which form between the points $x$, $x'$, in Fig. 2, the outer side walls of the inner section 1, which slide in the walls 13 of the outer box. The film passes across the camera in the focal plane at $x'$ and passes just inside of the aperture 14 in the rear door 3, which aperture is covered by a ruby glass, from whence the film passes to the winding spool or reel.

The outer casing is provided with an observation hood 15, which is hinged at 16, and provided with flexible side walls 17. A ground glass for focusing the image is shown at 18. The structure so far described is all of a well-known type. The inner box 1 is provided with an inclined partition 19, on which is centrally mounted on a stud 20 the shutter 21, which carries the mirror or reflecting surface 22.

22' represents the opening in the shutter through which the exposure takes place on the rotation of the shutter. This opening is preferably an approximate semi-ellipse in form, the minor axis of the ellipse being practically equal to the width of the exposure opening 23 in partition 19, this being calculated to permit the passage of all the light admitted through objective 8. Normally, the mirror 22 covers the exposure opening 23 in the partition 19, and the parts are so arranged that the image of the scene viewed through objective 8 will be reflected by mirror 22, full size, upon focusing glass 18. When mirror 22 is removed from in front of exposure opening 23, an exposure may be taken through the latter and through opening 22' in the shutter, upon the sensitized film or surface located in the focal plane, and attention will now be directed to the means for so moving the mirror and the shutter carrying the same.

A spring 24 is attached centrally to the shutter 21, and is put under torsion to give shutter 21 force to revolve when released. The shutter is normally held against such revolution by the co-action of a stop 25 on the shutter, with a flexible spring or stop 26, which is fastened as by screws to the partition 19, at 27. Spring 24 is attached to a pin 28, which carries on its outer end a disk 29 provided with a handle 30. Pin 28 is rotatably mounted in a sleeve 31, which is mounted in partition 19, and in the rear member 32 of the inner box or section 1. Disk 29 is adapted to rotate on disk 33, mounted on the rear wall of member 32. The disk 29 may likewise be moved a short distance axially from plate 33, upon which it rests, this motion being resisted by spring 34, which is mounted in sleeve 31, and confined between the plate 33 and a collar on the inner end of pin 28. Disk 29 is provided with a finger 35, which is adapted to coact with inclined slot 36 in the disk 33, to lock the disk 29, and with it the shutter, against rotation, the inclined edge of the slot 36 serving to cam the finger 35 out of the slot and thus give the disk 29 the axial movement necessary to unlock the same, when handle 30 is rotated in a clockwise direction. To put spring 24 under torsion, handle 30 is rotated one revolution, as shown, in a clockwise direction, and finger 35 allowed to engage slot 36. The shutter is then given a tendency to rotate in a clockwise direction, as shown in Fig. 6, by the torsion spring 24, this tendency normally being counteracted by the co-action of stop 25 with spring 26. Spring 24 may be considered a flexible shaft, connecting the shutter with handle 30. Push pin 37 constitutes the means for releasing spring 26 to allow rotation of the shutter. This pin is mounted as shown, in partition 19 and member 32 of the inner section 1, and is provided with a head 38 between which and member 32 of the inner box is mounted spring 39, the tendency of which is to keep pin 37 constantly pressed to the right, (reference to Fig. 1). The inner end of the pin 37 extends against the under side of spring 26. A light push upon head 38, of pin 37, therefore, quickly released, is sufficient to disengage spring 26 from stop 25, allowing shutter 21 to make one complete revolution, giving an instantaneous exposure through opening 23. The pressure upon head 38 being released, spring 26 immediately returns to its original position, whereby spring 26 intercepts stop 25, when the latter returns to its original position after one revolution. Spring 40 is provided, which bears with a slight pressure upon the side of stop 25 when the latter is in position engaging spring 26, the function of this spring 40 being to reduce the force of the impact of stop 25 with the end of the spring 26, and to prevent recoil of stop 25 from such impact. A second stop 41 is provided at a point approximately diametrically opposed to stop 25 on shutter 21. This stop as shown in Fig. 10 is provided with a short arm or offset 42, which is located at the same radial distance from the center of the shutter as the end of stop 25, but which offset 42 overhangs the shutter in such a way as to leave a certain amount of clearance between the plane in which the top of stop 25 is located and the plane in which offset 42 of stop 41 terminates. Therefore, when push pin 37 is pushed sufficiently to cause spring 26 to just clear stop 25, the spring 26 will not be raised by pin 37 sufficiently to place the end thereof in the path of offset 42, when the shutter in its rotation carries stop 41 past spring 26, offset 42 in this case, passing above the end of spring 26. When, however, it is desired to make a time exposure, pin 37 is depressed against the pressure of spring 39 with greater force than in the case of an instantaneous exposure, and the pin is not immediately released as in that case, but on the contrary, the finger of the operator is held on the pin for whatever length of time an exposure is desired. The result of this greater pressure is that pin 37 flexes spring 26 to such an extent that it releases stop 25 and places itself in the path of offset 42 of stop 41, so that the shutter, released from its position of non-exposure, is arrested by the impact of offset 42 with the end of spring 26 to hold the shutter in full exposing position with opening 23 in partition 19, fully uncovered as in Fig. 8. This gives, of course, a time exposure, or rather what is known as a bulb exposure, since its operation depends entirely upon the pressure of the operator's finger on head 38 of pin 37. When this pressure is released, spring 26 immediately releases stop 41 and springs back into position to arrest the shutter in its position of non-exposure with stop 25 in contact with the end of spring 26. After either an instantaneous or a time exposure, the operator rewinds spring 24, as previously described by giving the operating handle 30 a rotation to the right, whereupon the shutter is again prepared for operation.

It will, of course, be understood that many changes are possible in the structural details of my invention without departing from the spirit thereof. For example, while my invention has been described in connection with a particular form of camera employing sensitive film, it might have been shown as well in connection with other types of cameras. Also, while spring 26 has been described as being forced into the path of stop 41 by being flexed in the direction at right angles to shutter 21, the parts or equivalent parts, may be employed in other arrangements without any departure from this invention.

Having now described my invention, what I claim as new therein and desire to secure by Letters Patent is as follows:—

1. In a camera, the combination with an objective and a focusing glass, of a rotatable shutter interposed between the objective and the focal plane, said shutter carrying a reflecting surface arranged to reflect the image onto the focusing glass, when the shutter is in non-exposing position, means for rotating said shutter to make an exposure, means for holding said shutter in exposing or non-exposing position; and a single manipulative means coöperating with said holding means, whereby the length of such exposure may be regulated at will, substantially as set forth.

2. In a camera, the combination with an objective, of a shutter interposed between the objective and the focal plane, means tending to move said shutter, movable means, a stop carried by said shutter and normally co-acting with said movable means to hold said shutter in position for preventing an exposure, a second stop carried by said shutter and having an offset portion co-acting with said movable means for holding said shutter in position to effect a time exposure, the said offset portion being spaced from said shutter and from the plane passing through said first stop parallel to said shutter, and a single manipulative means for moving said movable means to release said first stop therefrom, and to move said movable means into the path of said second stop or not, as desired, substantially as described.

3. In a camera, the combination with an objective of a rotary shutter interposed between the objective and the focal plane, means tending constantly to rotate said shutter, said shutter provided with two oppositely disposed stops thereon, locking means co-acting with one stop to normally hold said shutter in position to prevent an exposure, push means arranged to trip said locking means by a slight push to effect an instantaneous exposure, and to cause said locking means to intercept said second stop when actuated by a push of greater force and duration, to effect a time exposure, substantially as described.

4. In a camera, the combination of an objective, a shutter interposed between the objective and the focal plane, means tending continuously to move said shutter from a non-exposing position through exposing position to a non-exposing position, movable means, a stop carried by said shutter and normally coacting with said movable means to hold said shutter in position for preventing an exposure, a second stop carried by said shutter and having an offset portion coacting with said movable means for holding said shutter in position to effect a time exposure, the said offset being spaced from said shutter and from the plane passing through said first stop parallel with said shutter, and manipulative means for moving said movable means to release said first stop therefrom, and to move said movable means into the path of said second stop or not, as desired, substantially as described.

5. In a camera, the combination with an objective, of a rotatable shutter carrying two stops arranged peripherally, locking means adapted to co-act with said stops and normally co-acting with one of them, means for forcing said locking means out of contact with said stop and to a greater or less distance beyond said stop by the application of a greater or less force respectively to said forcing means, the second of said stops being so placed as to contact said locking means on the revolution of the shutter, when the locking means is forced to a greater extent, and to miss contact with said locking means, when the latter is forced to a less extent, substantially as described.

6. In a camera, the combination with an objective, of a rotatable shutter carrying two stops arranged peripherally, a flexible spring adapted to co-act with said stops and normally co-acting with one of them, spring push means for flexing said spring out of contact with said stop and to a greater or less distance beyond said stop, the second of said stops being so placed as to contact said spring on the revolution of the shutter when the spring is forced to a greater extent, and to miss contact with said spring when the latter is forced to a less extent, said spring returning into position to intercept said first stop when the pressure on it is removed, substantially as described.

7. In a camera, a rotatable shutter provided with a stop, means co-acting with said stop to prevent rotation of said shutter, means to rotate said shutter, means for momentarily releasing said stop to permit rotation of said shutter, and means adapted to coact with said stops to prevent rebound of said shutter when said stop next encounters said co-acting means, substantially as described.

8. In a camera, the combination of a shutter carrying a reflecting surface, with an objective and a focusing glass on which is thrown the image reflected by the reflecting surface, when the shutter is in non-exposing position, means for moving said shutter to make an exposure, and push means whereby the length of such exposure may be regulated at will by the extent and duration of the push employed, substantially as described.

9. In a camera, a rotatable shutter, means tending to rotate said shutter, means for holding said shuttter against rotation in either exposing or non-exposing position, said means comprising two stops carried by said shutter and located at positions equidistant from the axis thereof, and means adjustable to release said holding means whereby an instantaneous or a time exposure of any desired length may be obtained at will, substantially as described.

10. In a camera, the combination with the objective, of a rotatable shutter interposed between the objective and the focal plane, means for holding said shutter in exposing or non-exposing position, means for rotating said shutter to make an exposure, and a single manipulative means coöperating with said holding means whereby the length of said exposure may be regulated at will, substantially as described.

This specification signed and witnessed this 4th day of November 1908.

ALEXANDER N. PIERMAN.

Witnesses:
  DYER SMITH,
  A. R. KLEHM.